(12) United States Patent
Chen et al.

(10) Patent No.: US 7,631,594 B2
(45) Date of Patent: Dec. 15, 2009

(54) GEAR-DRIVEN LOCKING ASSEMBLY FOR BREW HEAD ASSEMBLY

(75) Inventors: Andrew Yuen Chin Chen, Hong Kong (HK); Tin Yiu So, Hong Kong (HK)

(73) Assignee: Electrical and Electronics Limited, Hong Kong (HK)

( * ) Notice: Subject to any disclaimer, the term of this patent is extended or adjusted under 35 U.S.C. 154(b) by 531 days.

(21) Appl. No.: 11/270,021

(22) Filed: Nov. 9, 2005

(65) Prior Publication Data
US 2007/0017375 A1    Jan. 25, 2007

Related U.S. Application Data

(63) Continuation-in-part of application No. 11/188,244, filed on Jul. 22, 2005.

(51) Int. Cl.
*A47J 31/40* (2006.01)
*A47J 31/44* (2006.01)

(52) U.S. Cl. .............. 99/289 R; 99/295; 99/302 R

(58) Field of Classification Search .............. 99/302 R, 99/295, 279, 307, 293, 289 R; 220/315, 220/317, 327; 70/190, 191, 159, 160; 292/199, 292/200, 280, 194, 195, 203
See application file for complete search history.

(56) References Cited

U.S. PATENT DOCUMENTS

| | | | | |
|---|---|---|---|---|
| 708,097 | A * | 9/1902 | Tower | ............ 292/199 |
| 3,270,659 | A * | 9/1966 | Tavera | ............ 99/295 |
| 3,713,377 | A | 1/1973 | Arnett et al. | |
| 4,315,577 | A * | 2/1982 | Bernson, Jr. | ............ 220/323 |
| 5,638,741 | A | 6/1997 | Cisaria | |
| 5,992,298 | A | 11/1999 | Illy et al. | |
| 6,009,792 | A * | 1/2000 | Kraan | ............ 99/295 |
| 6,490,966 | B2 | 12/2002 | Mariller et al. | |
| 2005/0132891 | A1 | 6/2005 | Chen et al. | |
| 2008/0236403 | A1 * | 10/2008 | Cortese | ............ 99/323 |

FOREIGN PATENT DOCUMENTS

EP    1495703 A1    12/2005
WO    WO2004028318 A1    4/2004

* cited by examiner

*Primary Examiner*—Reginald L Alexander
(74) *Attorney, Agent, or Firm*—George A. Herbster

(57) ABSTRACT

The present invention pertains to a brew head assembly comprising a gear-driven locking assembly and a sealing assembly, whereby the brew head assembly is capable of sustaining pressures up to 20 bars. The locking assembly comprises a lever, drive rod having a gear or a gear-toothed surface, drive rod clamp, lock plate having a gear-toothed surface or a gear on its upper surface, lock plate or gear stopper, lid mount, and brew head bottom, all operatively linked to form the locking assembly. In a preferred embodiment, the lock plate is in the form of a sliding member or rotating disk. Gear or gear-toothed surface on the lock plate mates or meshes with the corresponding gear or gear-toothed surface on the drive rod, such that movement of the lever translates rotation of the drive rod and into either a linear or rotational movement of the lock plate between a locked or unlocked position.

36 Claims, 15 Drawing Sheets

GEAR-DRIVEN LOCKING ASSEMBLY FOR BREW HEAD ASSEMBLY

This application is a continuation-in-part of co-pending application Ser. No. 11/188,244, filed Jul. 22, 2005, the contents of which are incorporated in their entireties by reference into this application.

Throughout this application, various publications are referenced. The disclosures of these publications in their entireties are hereby incorporated by reference into this application to more fully describe the state of the art to which this invention pertains.

BACKGROUND OF THE INVENTION

Single-serving coffee makers have become more popular in recent years. Most single-serving machines use a pressure pump to deliver heated liquid or water during the brewing process. Many different pressure- or fluid-tight locking mechanisms have therefore been developed for pressurized coffee makers. These locking mechanisms typically use a slider to lock or secure the brew head of the coffee maker. For instance, WO2004028318 (see also U.S. Pat. No. 6,995,015) describes a locking mechanism that uses a toggle joint lever system to move the slider to the open or closed position. One disadvantage of using a toggle joint lever system to move the slider is that, for proper operation, the lever can only be mounted on the front center of the brew head.

The gear-driven rocking assembly of the present invention allows the lever to be placed or located either on the top, rear, side or in the front of the brew head assembly. The construction of the present invention is more dynamic and flexible, and can be adapted for sliding or rotating the locking member or element between a locked and an unlocked position. An advantage of the gear-driven locking assembly of the present invention is that only a small force is required to turn the lever for locking. In one embodiment, the locking assembly is capable of withstanding pressures up to 4 bars. In another embodiment, the locking assembly is capable providing fluid- and/or pressure-tight seal up to 20 bars. Typically for a single-serve brewing device, a locking assembly capable of maintaining fluid- and/or pressure-tight seal up to between 3-4 bars may be sufficient. For an espresso machine, however, a locking assembly capable of providing fluid- and/or pressure-tight seal at higher pressures, preferably between 15-20 bars, may be required. In a locking assembly of the present invention adapted for maintaining fluid- and/or a pressure-tight seal up to 20 bars, the components, such as the seal, locking cam(s) and corresponding recess(es), are provided with increased strength.

SUMMARY OF THE INVENTION

The brew head assembly of the present invention comprises two key, interconnected components: a gear-driven locking assembly and a sealing assembly.

The gear-driven locking assembly of the invention comprises the following parts which are all operatively linked to form the gear-driven locking assembly: a lever, a drive rod provided with a gear or a gear-toothed surface, a drive rod clamp, a lock plate provided with a gear-toothed surface or a gear disposed on its upper surface, a lock plate stopper or a gear stopper, a lid mount, and a brew head bottom. In an embodiment, the parts are assembled from molded components. In another embodiment, the parts are molded or forged from plastic, metal, or any other suitable material known in the art having a sufficient combination of strength and rigidity to maintain its structural integrity.

The sealing assembly of the invention comprises the following parts which are all operatively-linked to form the sealing assembly: a seal ring, a water spreader, a pod ejector, a metal filter, a pod holder, and a coffee collector.

The operation of the locking assembly of the present invention is performed as follows:

Initially, the locking assembly is in the closed position. Before brewing coffee, a coffee pod or an appropriate amount of coffee grounds (or tea, hot chocolate, etc.) are placed in the pod holder. The pod holder can be removed for cleaning or refilling purposes by unlocking the brew head.

In one embodiment of the present invention, the locking or unlocking of the brew head assembly is effectuated or assisted by a plurality of cams provided on a rotating lock plate and corresponding recesses situated on the brew head assembly. In a specific embodiment, the lock plate comprises at least two cams and the brew head assembly is provided with corresponding recesses. In a preferred embodiment, the lock plate comprises at least three cams and the brew head assembly is provided with corresponding recesses. In another embodiment, the cams are provided on the brew head assembly and the recesses are provided on the rotating lock plate. Rotation of the lock plate, preferably about a vertical or substantially vertical axis, displaces the locking assembly between a locked and an unlocked position.

When the lever is lifted upward, the drive rod, which is rotatably mounted to the lid mount by a drive rod clamp, rotates in the direction of the force applied by the lever. The rotation of the drive rod causes the intermeshing gears and/or gear-toothed surfaces disposed on the drive rod and on the lock plate to rotate integrally with or relative to each other, and the lock plate rotates in the direction that disengages the cams from their corresponding recesses and unlocks the brew head assembly. In an embodiment, the drive rod is rotatably mounted to the lid mount by a suitable clamp or anchoring part/member.

Conversely, when the lever is pushed downward, the drive rod rotates in the direction of the force applied by the lever. The rotation of the drive rod in the reverse direction (relative to previous paragraph) causes the intermeshing gears and/or gear-toothed surfaces disposed on the drive rod and on the lock plate to rotate integrally with or relative to each other, and the lock plate rotates in the direction that engages the cams with their corresponding recesses and locks the brew head assembly.

When the brew head assembly is open, a lock plate stopper provided on the lid mount prevents the lock plate from rotating when the lever is subsequently pulled downward to close the brew head assembly. In an embodiment, the lock plate stopper has an inverse U-shape with two prongs. In another embodiment, a spring 27 or the like is mounted on at least one prong of the lock plate stopper, and the lock plate stopper is operatively mounted on the lid mount such that when the brew head assembly is open, the spring pushes the lock plate stopper downward and through the lid mount to restrict the movement of the lock plate. When the brew head assembly is closed, the lock plate stopper is pushed upward allowing the lock plate to rotate freely. In an embodiment, the lock plate stopper is pushed upward by a top surface of the brew head bottom when the brew head assembly is closed.

In another embodiment of the present invention, the locking and unlocking of the brew head assembly is effectuated or assisted by a plurality of cams provided on a sliding lock plate and corresponding recesses provided on the brew head assembly. In a specific embodiment, the lock plate comprises at least two cams and corresponding recesses provided on the brew head assembly. In a preferred embodiment, the lock plate comprises at least three cams and corresponding recesses provided on the brew head assembly. Movement of the sliding lock plate in a substantially horizontal plane displaces the locking assembly between a locked and an unlocked position. In another embodiment, the cams are provided on the brewing assembly and the corresponding recesses are provided on the sliding lock plate.

When the lever is lifted upward, the drive rod, which is rotatably mounted to the lid mount by a drive rod clamp, rotates in the direction of the force applied by the lever. The rotation of the drive rod causes the intermeshing gears and/or gear teeth surfaces disposed on the drive rod and on the slide lock plate to move integrally with or relative to each other and the slide lock plate slides in the direction which disengages the cams from their corresponding recesses and unlocks the brew head assembly.

Conversely, when the lever is pushed downward, the drive rod rotates in the direction of the force applied by the lever. The rotation of the drive rod in the reverse (relative to the previous paragraph) direction causes the intermeshing gears and/or gear teeth surfaces disposed on the drive rod and on the slide lock plate to move integrally with or relative to each other and the slide lock plate slides in the direction which engages the cams with their corresponding recesses and locks the brew head assembly.

When the brew head assembly is open, a gear stopper provided on the lid mount meshes with or engages the gear-toothed surface of the drive rod and prevents the lock plate from sliding when the lever is subsequently pulled downward to close the brew head assembly. In an embodiment, the gear stopper has an inverse L shape formed by an upper horizontal member and a vertical member. In another embodiment, the upper horizontal member comprises a hook-like member or an appropriately shaped protrusion for engaging the gear or gear-toothed surface. In another embodiment, a spring or the like is mounted on the vertical member of the gear stopper. The gear stopper is mounted on the lid mount such that when the lid mount is open, the spring pushes the gear stopper downward to restrict the movement of the lock plate. When the brew head assembly is closed, the gear stopper rises upward to allow the lock plate to move freely. In another embodiment, a top surface of the brew head bottom pushes the gear stopper upward when the brew head assembly is closed.

In one embodiment, the cams and corresponding recesses are situated and dimensioned in a way such that the cams can only engage the recesses when the lid frame or upper brew head closes off the brew head bottom of the brew head assembly completely. In a preferred embodiment, the cams and corresponding recesses are wedge-shaped to facilitate the mating of the cams with the corresponding recesses.

The position of the cams and corresponding recesses can vary. For example, the cams and corresponding recesses can be placed in a circular or linear arrangement. Furthermore, the cams can be evenly spaced on the lock plate, and the corresponding recesses can be evenly spaced along the periphery of the brew head bottom.

This invention provides a gear-driven locking assembly for a brew head assembly, comprising: lever, drive rod, drive rod clamp, rotating lock plate, lid mount, and brew head bottom, all operatively linked to form the gear-driven locking assembly.

This invention provides a gear-driven locking assembly for a brew head assembly, comprising: lever, drive rod, drive rod clamp, sliding lock plate, lid mount, and brew head bottom, all operatively linked to form the gear-driven locking assembly.

This invention provides a brew head assembly, comprising: a gear-driven locking assembly; and a sealing assembly, where the locking assembly and sealing assembly are operatively linked to sustain pressure up to four (4) bars. In another embodiment, the locking assembly and sealing assembly are fabricated to provide fluid- and/or pressure-tight connection up 20 bars.

DETAILED DESCRIPTION OF THE FIGURES

The present invention pertains to a brew head assembly of a coffee machine comprising a locking assembly which permits easy one-hand operation by a user. The brew head assembly also comprises a sealing assembly. In a preferred embodiment, the brew head assembly is capable of sustaining pressures up to 4 bars.

The accompanying FIGS. 1 to 15 are intended to illustrate non-limitative embodiments of the present invention.

In one embodiment, the brew head assembly comprises a gear-driven rotating lock plate latching/locking assembly, shown in FIGS. 1 to 7.

Figure 3:
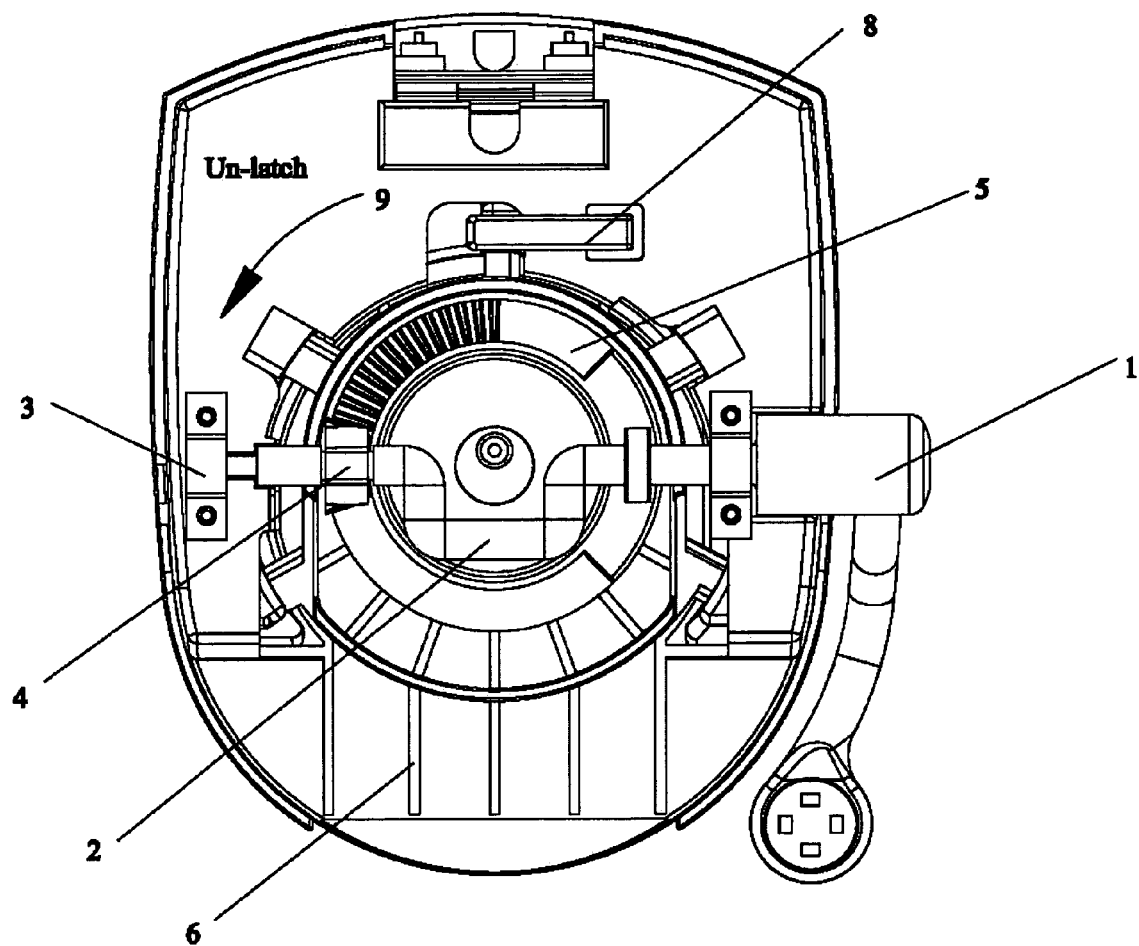

FIG. 3 is a top view of a brew head assembly comprising a gear-driven locking assembly in the latched/locked position. The brew head assembly can be unlatched/unlocked with one hand by lifting the lever 1 upward. The upward movement of the lever causes the lock plate 5 to rotate in the direction illustrated by arrow 9 (counterclockwise) to unlatch/unlock the brew head assembly.

Figure 4:
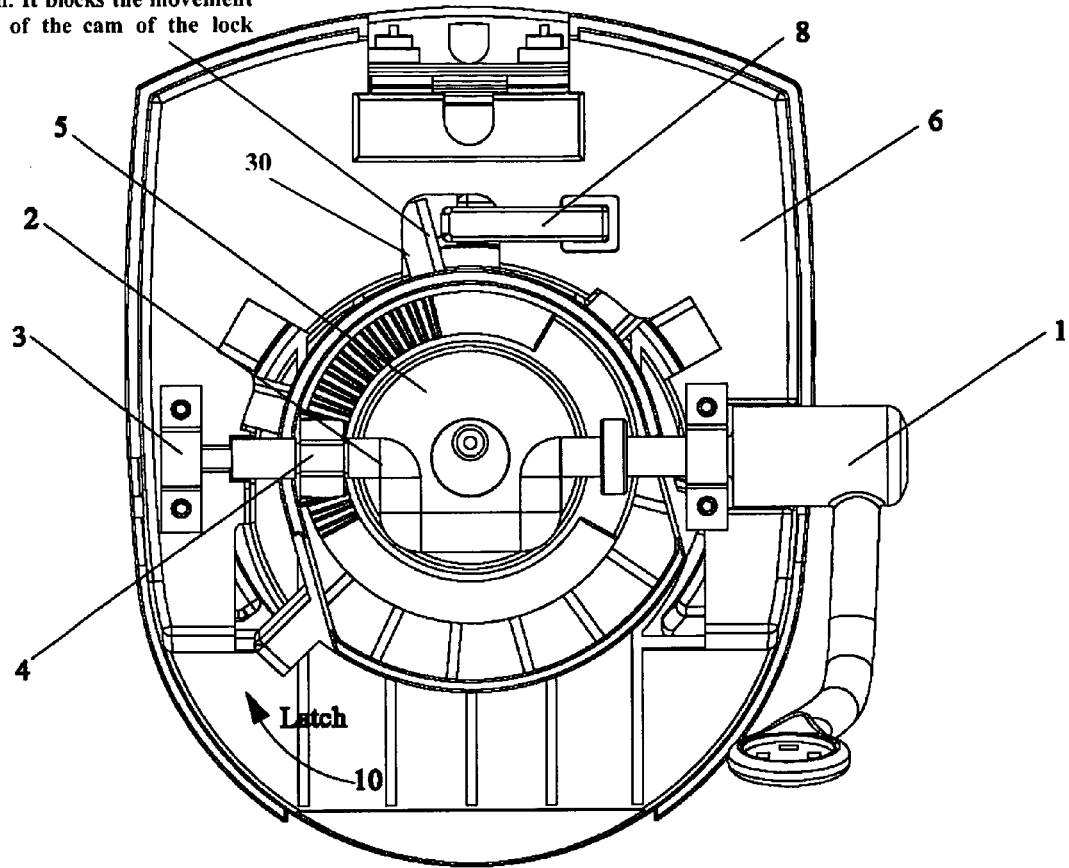

FIG. 4 is a top view of a brew head assembly comprising a gear-driven locking assembly in the unlatched/unlocked position. The brew head assembly can be latched/locked with one hand by pushing the lever 1 downward. The downward movement of the lever causes the lock plate 5 to rotate in the direction illustrated by arrow 10 (clockwise) to latch/lock the brew head assembly.

Figure 5:
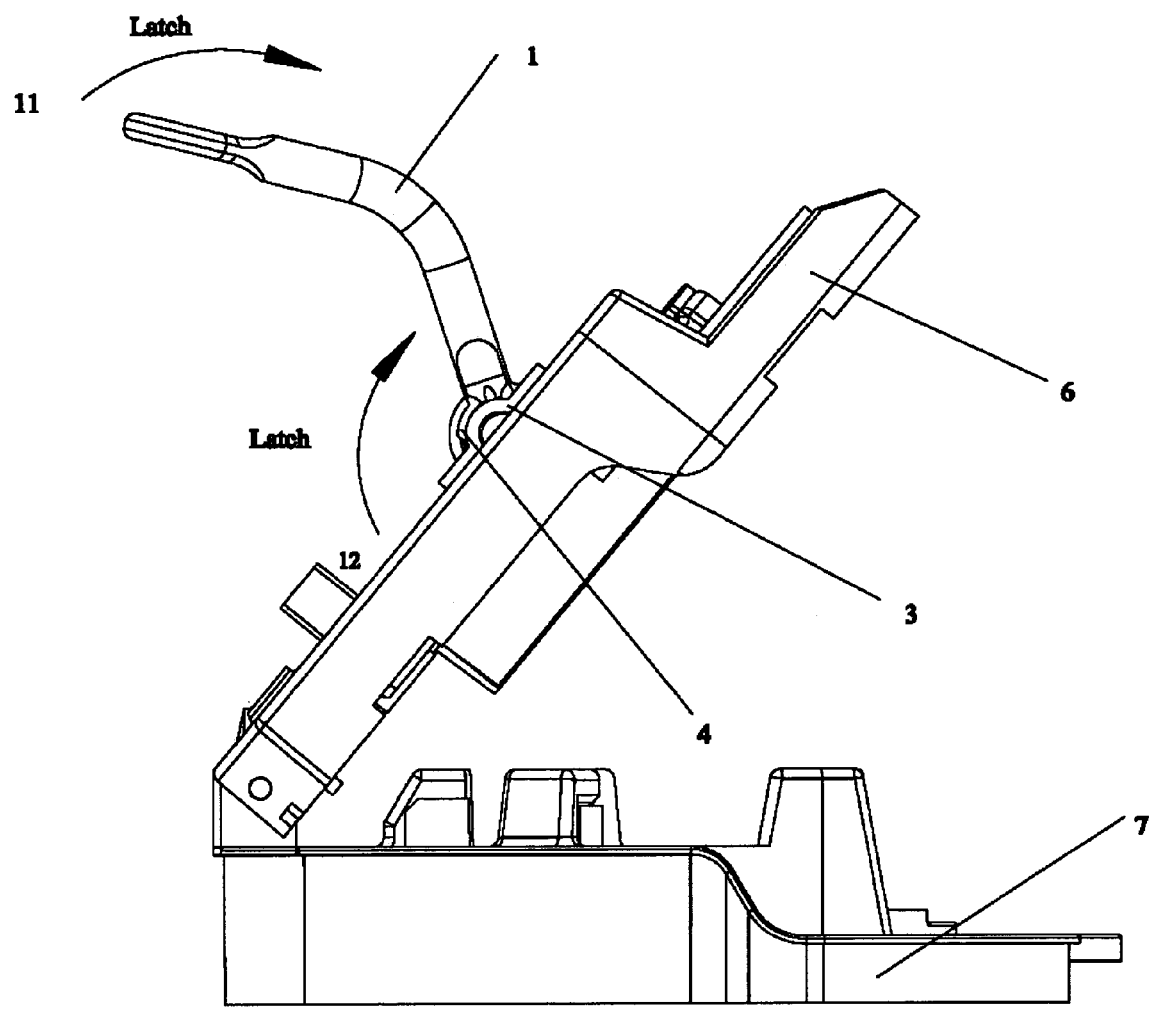

FIG. 5 is a side view of a brew head assembly, comprising a gear-driven locking assembly. The lid mount is pivotally attached to the brew head bottom. Arrow 11 shows the movement of the lever 1 when latching/locking the brew head assembly. Arrow 3.12 shows the rotational movement of the gear when latching/locking the brew head assembly.

Figure 6:
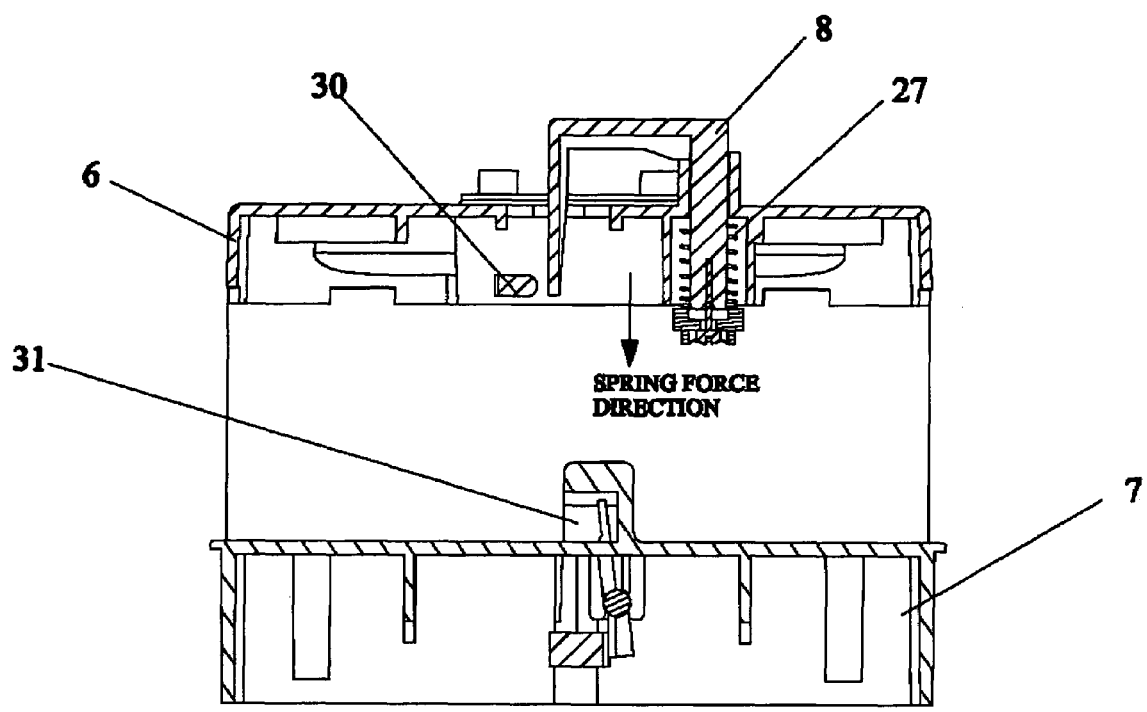

FIG. 6 is a cross-sectional view of a lock plate stopper when the brew head assembly is open. A spring is mounted on one prong of the lock plate stopper such that the lock plate stopper is urged or pushed downward by the force of the spring. The lock plate stopper is configured to restrict the movement of the cam on the lock plate when the lid mount is being closed.

Figure 7:
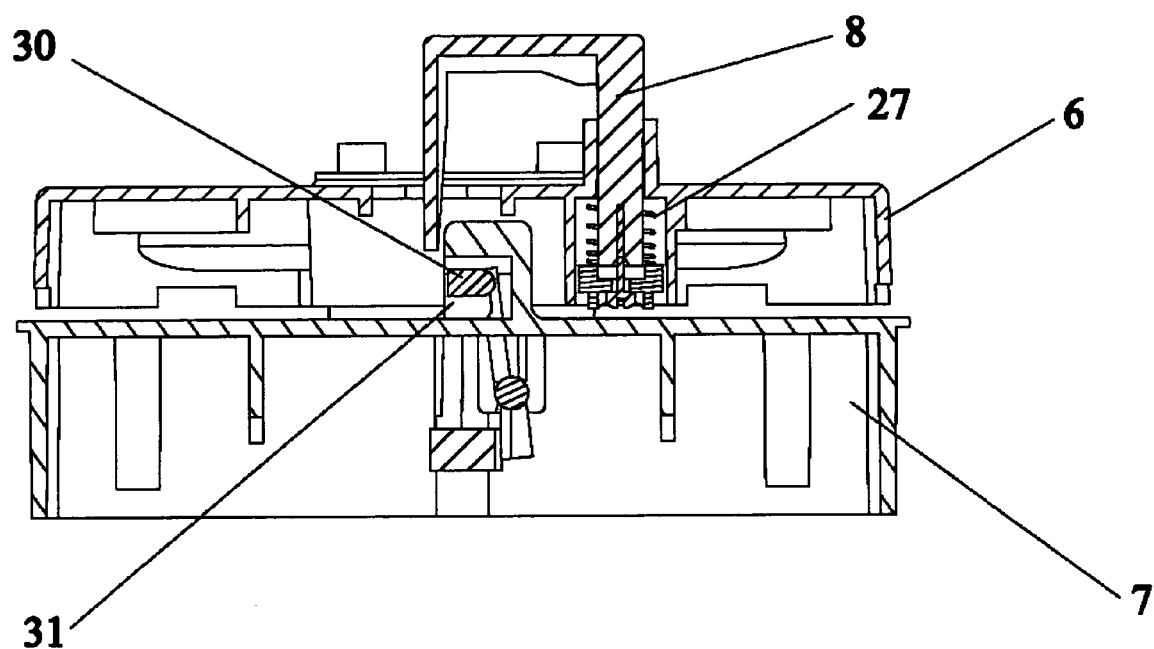

FIG. 7 is a cross-sectional view of a lock plate stopper when the brew head assembly is closed. When the brew head assembly is closed, the lock plate stopper is pushed upward up by the brew head bottom to allow the lock plate to move freely.

In another embodiment, the brew head assembly comprises a gear-driven sliding lock plate latching/locking assembly as shown in FIGS. 8 to 14.

Figure 8:
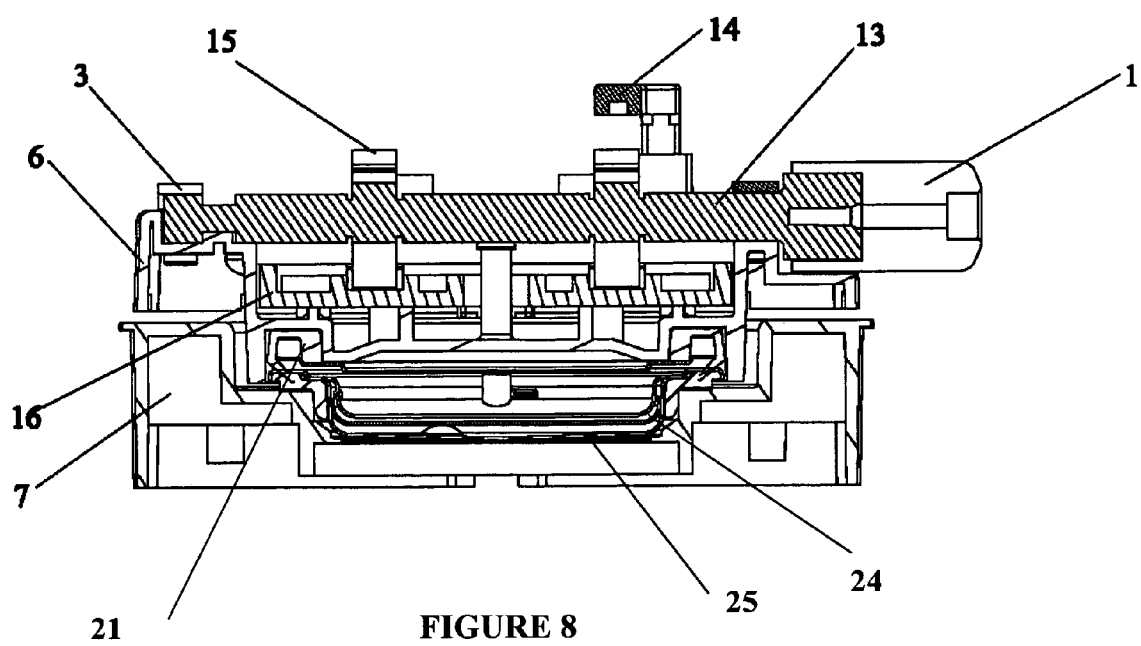

FIG. 8 is a cross-sectional view of a brew head assembly comprising a gear-driven sliding locking assembly.

Figure 9:
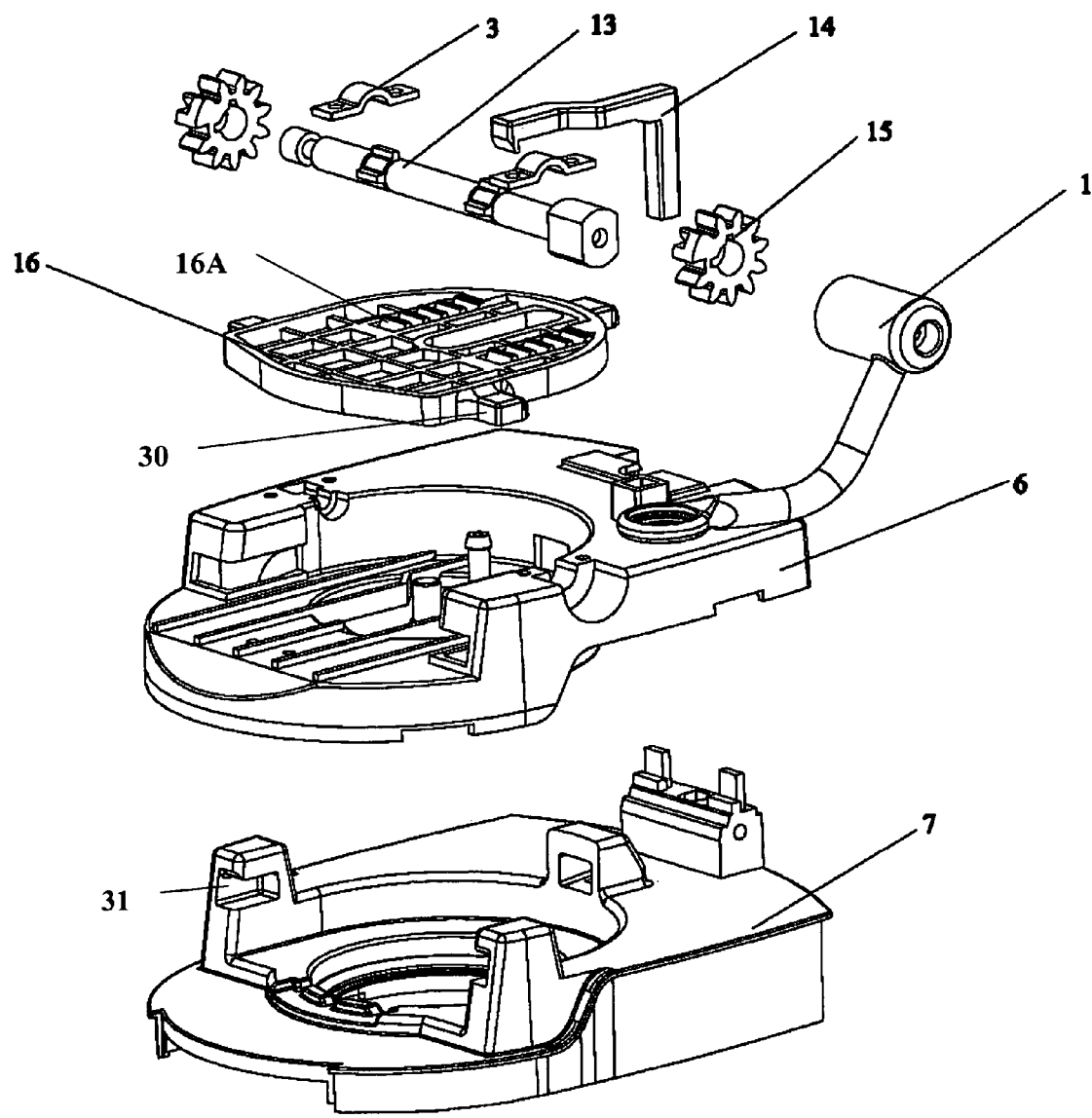

FIG. 9 is an exploded view of a brew head assembly comprising a gear-driven locking assembly. The locking assembly further comprises a slider or sliding lock plate 16.

Figure 10:
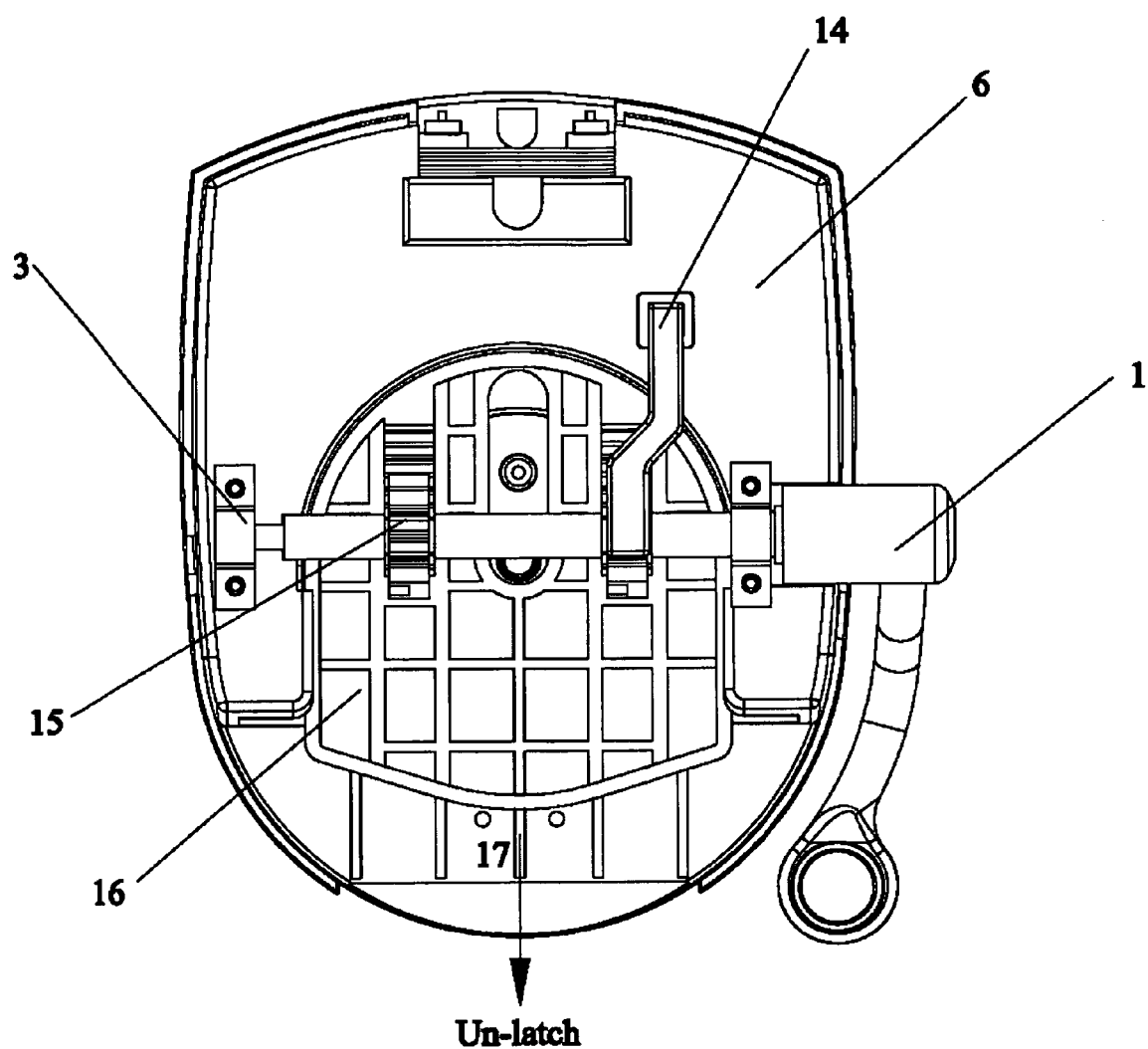

FIG. 10 is a top view of a brew head assembly comprising a gear-driven locking assembly in the latched/locked position. The brew head assembly can be unlatched/unlocked with one hand by lifting the lever 1 upward. The upward movement of the lever causes the slider or sliding lock plate 16 to move outward in the direction of arrow 17 to unlatch/unlock the brew head assembly.

Figure 11:
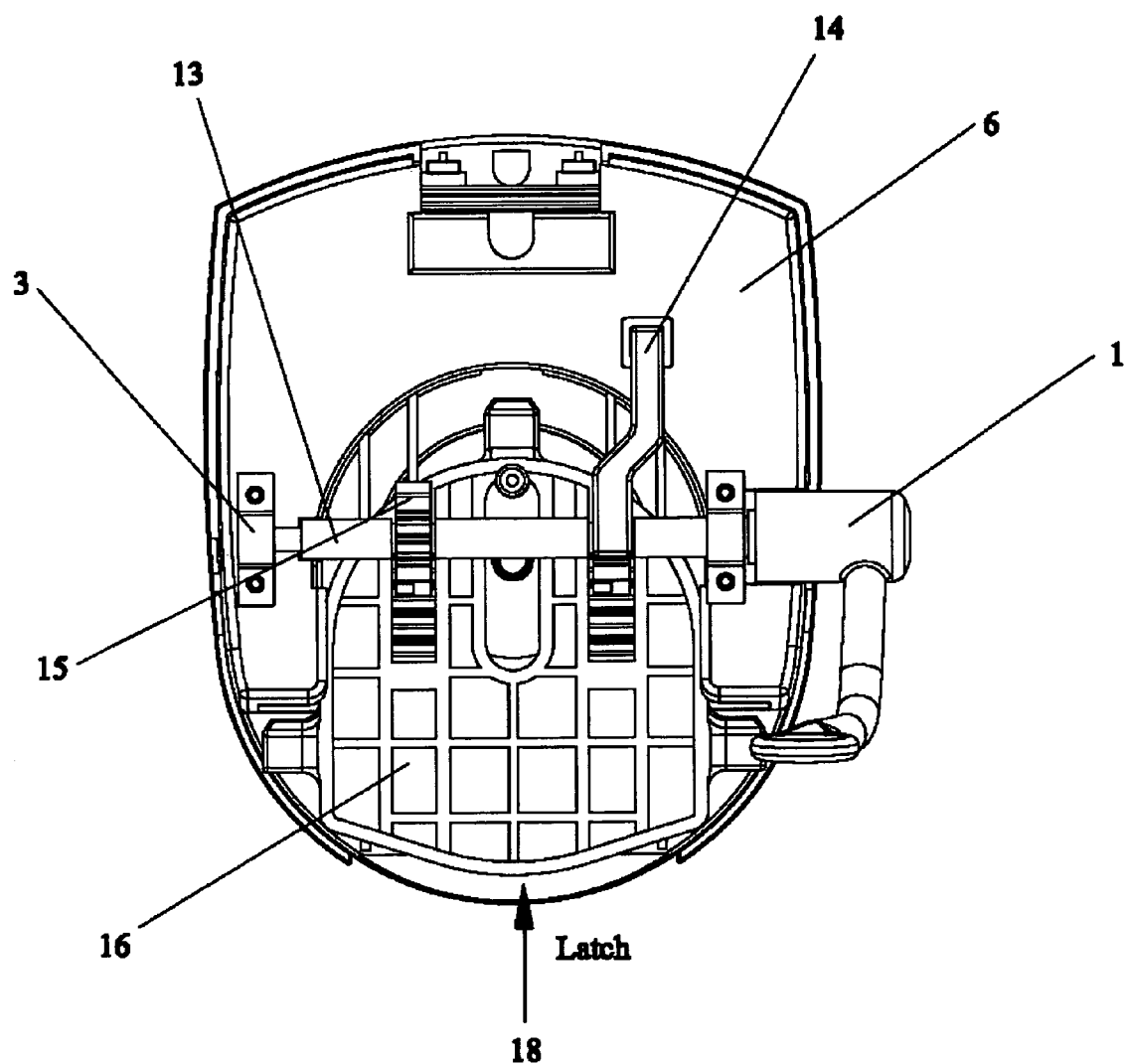

FIG. 11 is a top view of a brew head assembly comprising a gear-driven locking assembly in the unlatched/unlocked position. The brew head assembly can be latched/locked with one hand by pushing the lever 1 downward. The downward movement of the lever causes the slider or sliding lock plate 16 to move inward in the direction of arrow 18 to latch or lock the brew head assembly.

Figure 12:
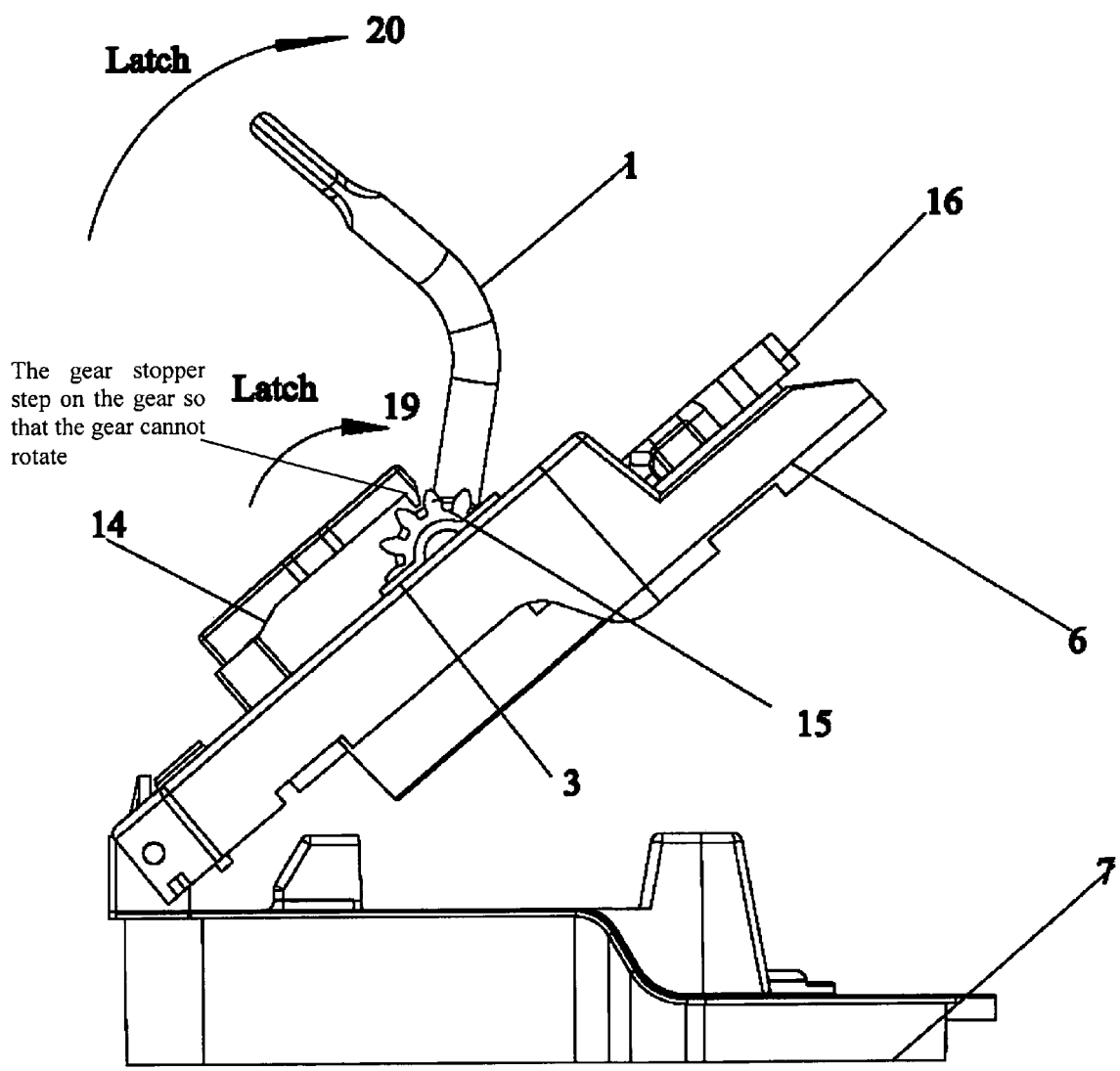

FIG. 12 is a side view of a brew head assembly comprising a gear-driven locking assembly. The lid mount is pivotally attached to the brew head bottom. Arrow 20 shows the movement of the lever 1 when latching/locking the brew head assembly. Arrow 19 shows the rotational movement of the gear when latching/locking the brew head assembly.

Figure 13:
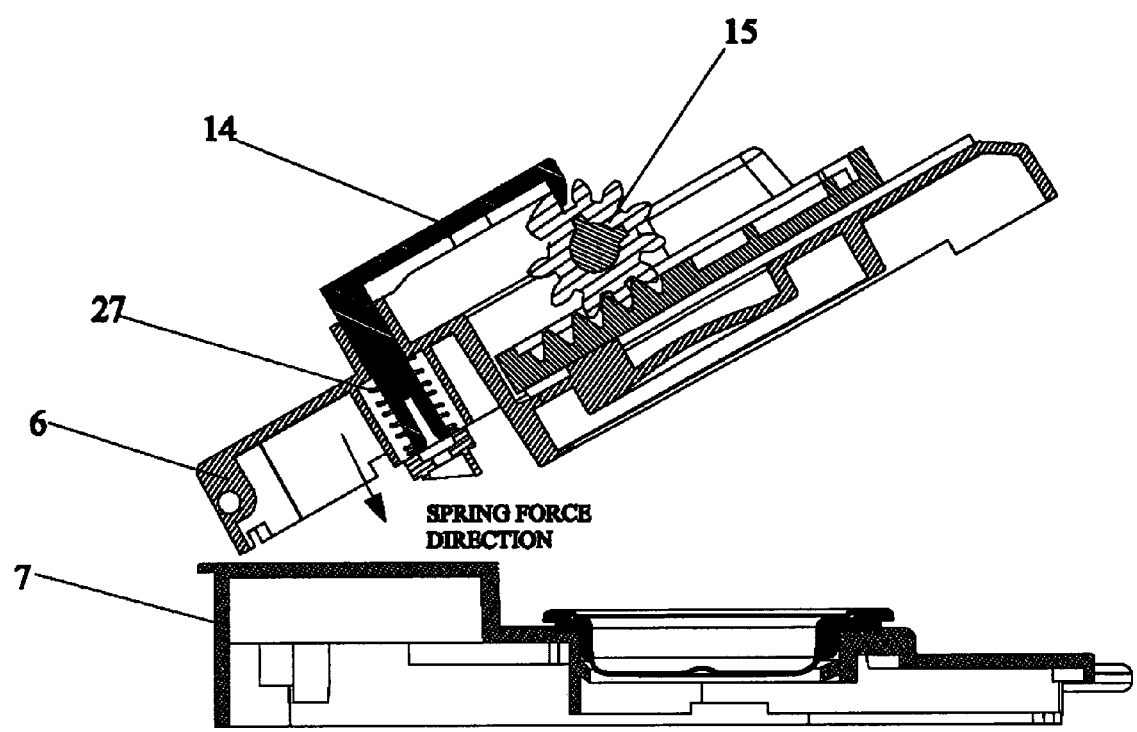

FIG. 13 is a cross-sectional view of a gear stopper when the brew head assembly is open. A spring 27 is mounted on the gear stopper such that the gear stopper is pushed downward by the force of the spring 27. The gear stopper restricts the movement of the gear or gear-toothed surface provided on the drive rod.

Figure 14:
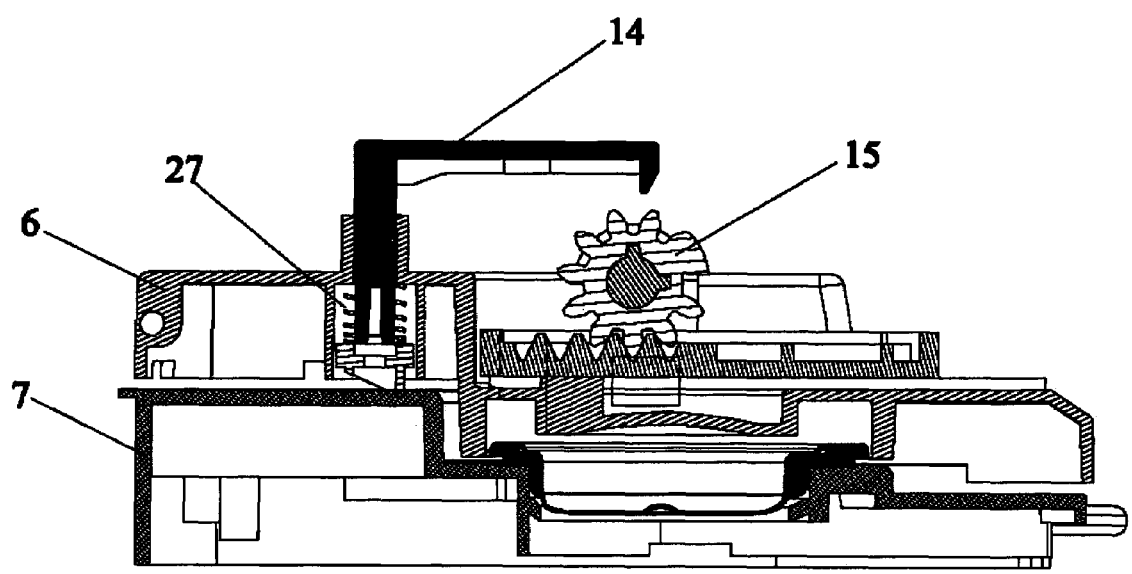

FIG. 14 is a cross-sectional view of a gear stopper when the brew head assembly is closed. The gear stopper is pushed upward by the brew head bottom to allow the sliding lock plate to move freely.

Figure 15:
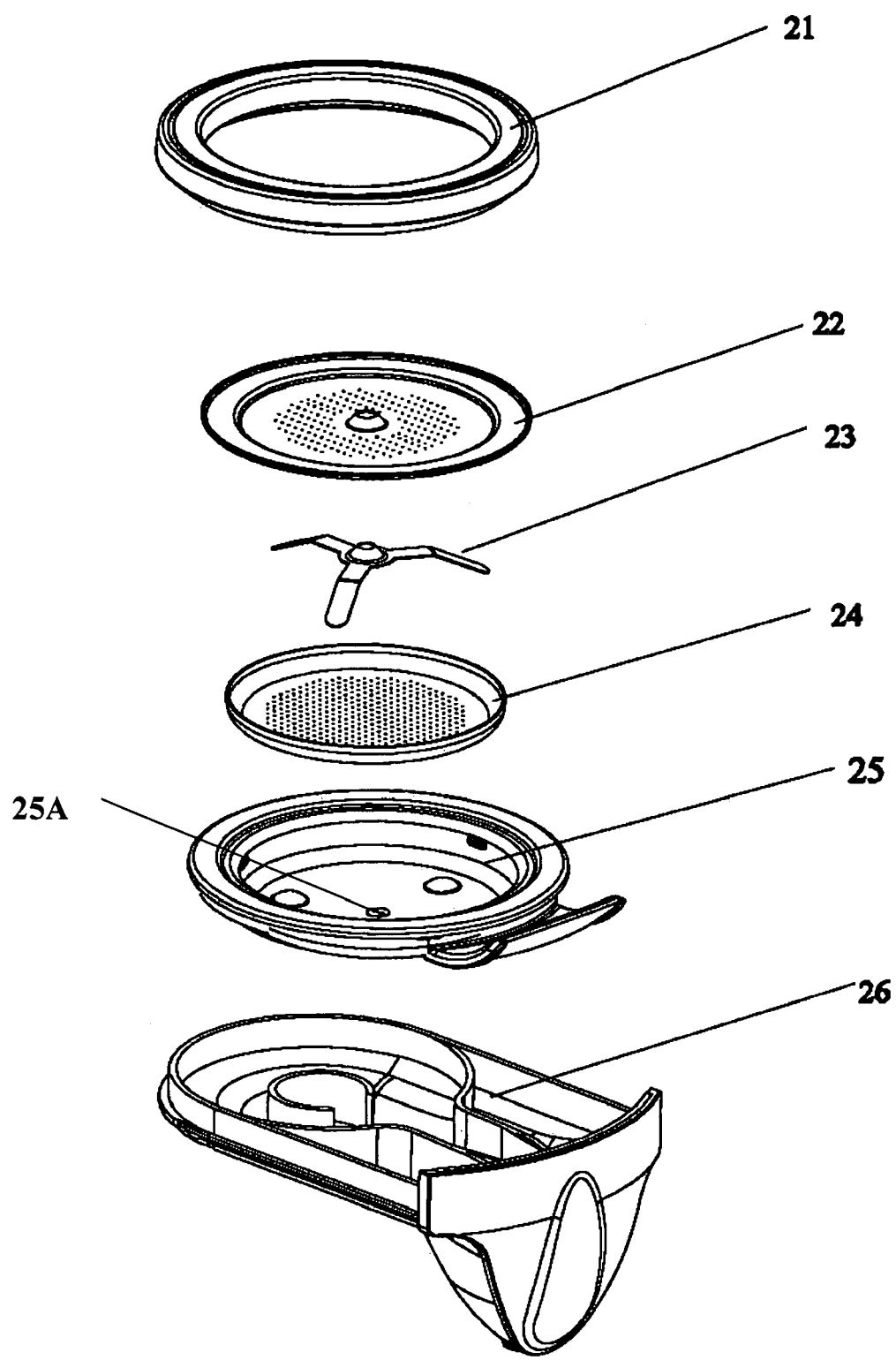

FIG. 15 is an exploded view of a sealing assembly of the present invention.

The present invention will be described primarily in connection with the preferred embodiments; however, it should be understood that there is no intent to limit the invention to the embodiments described. Suitable alternatives, modifications, or equivalents within the spirit and scope of the invention will become apparent upon reading the full disclosure herein.

DETAILED DESCRIPTION OF THE INVENTION

The present invention pertains to a brew head assembly of a coffee machine comprising a gear-driven locking assembly and a sealing assembly, operatively linked to form the brew head assembly. In a preferred embodiment, the brew head assembly is capable of sustaining pressures up to four (4) bars. In another embodiment, the locking assembly and the sealing assembly is adapted or fabricated to provide fluid- and/or pressure-tight connection of the brew head assembly up to twenty (20) bars. It should be noted that the present machine need not be limited to coffee machines. Those skilled in art will appreciate that the present invention may be utilized in situations consistent with its spirit, such as the brewing of teas, herbal medicines, or other extractions.

The present invention pertains to a brew head assembly for a brewing device, useful for locking and sealing the brew head, comprising an upper brew head part (lid mount) and a lower brew head part (brew head bottom), wherein the upper brew head part and the lower brew head part are pivotally joined, and the upper brew head part further comprises a lock plate, a drive rod, a gear, and a lever. The locking and unlocking action of the brew head assembly can be easily and quickly accomplished.

In an embodiment of the invention, a rotating lock plate is employed in the locking assembly. The lock plate is rotatably-mounted to the upper brew head part and rotates on a plane that is substantially parallel to a surface of the upper brew head part. The lock plate comprises a gear-toothed surface and at least 2 locking cams extending from the periphery of the lock plate. In an embodiment, the locking cams are provided on the periphery of the lock plate. The drive rod is horizontally mounted on the upper brew head part and joined to the lever. In a preferred embodiment, the drive rod is U-shaped.

A gear is mounted on the drive rod such that the drive rod passes through the center of the gear and the rotation of the rotating rod will cause the mounted gear to also rotate. The gear on the drive rod is positioned so that it mates or meshes with the gear-toothed surface on the lock plate. The corresponding recesses for engaging or disengaging the locking cams are provided on the lower brew head part. The downward and upward movement of the lever causes the lock plate to rotate so as to engage (lock) and disengage (unlock), respectively, the cams and corresponding recesses.

In one embodiment, the gear is a bevel gear, a gear-toothed surface, an annular bevel gear, a crown wheel, a wheel with cogs or teeth, a crown wheel and pinion, or the like. In another embodiment, the lock plate rotates about a vertical axis that is substantially perpendicular to the plane of the lower brew head part. In a further embodiment, the brew head assembly comprises a sealing assembly. In a further embodiment, the sealing assembly comprises a seal ring, water spreader, pod ejector, metal filter, pod holder, and coffee collector.

The brew head is locked or closed by pushing the handle downward, causing the drive rod and the mounted gear to rotate. Rotation of the gear causes the lock plate to also rotate, causing the locking cams to mate with the corresponding recesses provided on the lower brew head part.

The present invention further pertains to a brew head assembly for a brewing device, useful for locking and sealing the brew head, comprising an upper brew head part (lid mount) and a lower brew head part (brew head bottom), wherein the upper brew head part and the lower brew head part are pivotally joined. The upper brew head part further comprises a sliding lock plate, a drive rod, at least one gear, and a lever. The sliding lock plate is movably mounted to the upper brew head part and slides in a linear manner between a locked position and an unlocked position. The sliding lock plate comprises a gear-toothed surface and at least 2 locking cams extending from the periphery of the plate. In an embodiment, the locking cams are provided on the periphery of the lock plate. In a preferred embodiment, the gear teeth on the plate surface are arranged into one or more linear tracks.

The drive rod is horizontally mounted on the upper brew head part and joined to the lever. The gear(s) is/are mounted on the drive rod such that the drive rod passes through the center of the gear(s). Rotation of the drive rod causes the gear(s) to also rotate. Gear(s) mounted on the drive rod mate or mesh with the gear-toothed surface on the sliding lock plate. The corresponding recesses that engage or disengage with the locking cams are provided on the lower brew head part. In an embodiment, the recesses are provided on the lock plate and the cams are provided on the lower brew head part. The downward and upward movement of the lever causes the sliding lock plate to move between a locked position and an unlocked position. In a further embodiment, a linear gear teeth surface is provided on the sliding lock plate and a gear is mounted on the drive rod.

The brew head is locked or closed by moving the handle downward which causes the drive rod and the mounted gear(s) to rotate. The rotation of the mounted gear(s) causes the sliding lock plate to move linearly, i.e., inward, so that the locking cams mate with the corresponding recesses provided on the lower brew head part. In an embodiment, the recesses are provided on the lock plate and the cams are provided on the lower brew head part.

In a preferred embodiment, two gears are mounted on the drive rod. The space between the mounted gears may vary. In a particular embodiment, the gears are evenly spaced apart. In a further embodiment, the brew head assembly comprises a sealing assembly. In a further embodiment, the sealing assembly comprises a seal ring, water spreader, pod ejector, metal filter, pod holder, and coffee collector.

This invention provides a gear-driven locking assembly for a brew head assembly, comprising: a) lever, b) drive rod, c) drive rod clamp, d) rotating lock plate, e) lid mount, and f) brew head bottom, all operatively linked to form the gear-driven locking assembly. In an embodiment, the drive rod has a cylindrical shaft and comprises a gear or gear-toothed surface. In another embodiment, the gear or gear-toothed surface is a bevel gear or bevel gear-toothed surface. In a further embodiment, the drive rod is U-shaped or has a U-shaped member. In a further embodiment, the rotating lock plate comprises gear teeth on its top surface and at least two locking cams extending from the periphery thereof. In a further embodiment, the gear teeth on the top surface of the rotating lock plate are bevel gear teeth. In a further embodiment, the locking cams are wedge-shaped. In a further embodiment, the brew head bottom further comprises at least two recesses for engaging locking cams. In a further embodiment, the locking assembly further comprises a lock plate stopper.

This invention provides a gear-driven locking assembly for a brew head assembly, comprising: a) lever, b) drive rod, c) drive rod clamp, d) sliding lock plate, e) lid mount, and f) brew head bottom, all operatively linked to form the gear-driven locking assembly. In an embodiment, the drive rod has a cylindrical shaft and comprises a gear or gear-toothed surface. In another embodiment, the sliding lock plate comprises gear teeth on its top surface and at least two locking cams extending from the periphery thereof. In a further embodiment, the gear teeth on the top surface of the sliding lock plate are in a linear arrangement. In a further embodiment, the locking cams are wedge-shaped. In a further embodiment, the brew head bottom further comprises at least two recesses for engaging locking cams.

In a further embodiment, the locking assembly further comprises a gear stopper.

This invention provides a brew head assembly, comprising: a) a gear-driven locking assembly; and b) a sealing assembly, where the locking assembly and sealing assembly are operatively linked to sustain pressure up to four (4) bars. In an embodiment, the gear-driven locking assembly comprises a lever, drive rod, drive rod clamp, rotating lock plate or sliding lock plate, lock plate stopper or gear stopper, lid mount, and brew head bottom, all operatively linked to form the gear-driven locking assembly. In another embodiment, the sealing assembly comprises a seal ring, water spreader, pod ejector, metal filter, pod holder, and coffee collector, all operatively linked to form the sealing assembly. In a further embodiment, the seal ring is round with a flap on its bottom portion for improved sealing. In a further embodiment, the locking assembly and the sealing assembly provides liquid- and/or pressure-tight sealing of the brew head assembly.

Other advantages and embodiments of the present invention will become apparent upon reading the following examples.

EXAMPLES

The invention, being generally described, will be more readily understood by reference to the following examples which are included, merely for purposes of illustration of certain aspects and embodiments of the present invention and are not intended to limit the scope of the invention.

Example 1

Gear-Driven Rotating Lock Plate Locking Assembly

The gear-driven locking assembly of the present invention is useful for locking and unlocking the brew head assembly of a coffee maker. The gear-driven locking assembly comprises a lever, a drive rod with a gear or gear-toothed surface, a drive rod clamp, a lock plate with a gear-toothed surface or gear disposed on its upper surface, a lock plate stopper, a lid mount, and a brew head bottom, all operatively linked to form the gear-driven locking assembly. As used herein, gear includes, but is not limited to, annular bevel gear, bevel gear, crown wheel, wheel with cogs or teeth, and crown wheel and pinion. Other types of gears which are suitable and which are well-known to those skilled in the art may be found, for example, at "Gears Manufacturers Marketplace" at http://www.gears-manufacturers.com/crown-wheel-pinion.html.

A gear is mounted onto the drive rod. The drive rod is mounted on the lid mount and is attached to the lever. When the drive rod rotates, the mounted gear on the drive rod also rotates in the same direction as the drive rod. The lock plate is rotatably mounted on the lid mount. The teeth of the gear or gear-teeth surface disposed on the upper surface of the lock plate intermesh with the teeth of the gear or gear-toothed surface provided on the drive rod. Rotation of the drive rod also rotates the lock plate about a vertical or a substantially vertical axis. Rotation of the lock plate in one direction (e.g., clockwise) causes the cams provided on the lock plate to engage the corresponding recesses, and rotation of the lock plate in the other direction (e.g., counterclockwise) causes the cams provided on the lock plate to disengage from the corresponding recesses. In a preferred embodiment, the lock plate is provided with at least two locking cams.

The drive rod, gear or gear-toothed surface, and lock plate are forged, molded, constructed or fabricated from any material suitable for its intended function, such as metal, plastic, synthetic polymer, heat-resistant plastic, or the like. A suitable material may be forged injection molded into the desired form. The components or parts of the locking assembly should be constructed of a suitable material which will retain its strength and integrity and provide sturdy support. In a preferred embodiment, the drive rod and gear or gear-toothed surface is made of metal, preferably aluminum die cast. The lever, drive rod, gear or gear-toothed surface, drive rod clamp, lock plate stopper, and the lock plate are operatively and/or rotatably mounted on the lid mount.

This invention provides a gear-driven locking assembly comprising a lever mounted on one side of the brew head assembly which allows for one hand operation to lock or unlock the brew head assembly.

The locking and unlocking of the brew head assembly is effectuated or assisted by a plurality of cams provided on a rotating lock plate and by corresponding recesses provided on the brew head assembly, preferably on the brew head bottom. In a preferred embodiment, the lock plate comprises at least three cams and the brew head bottom comprises three corresponding recesses. In an embodiment, the cams are provided on the brew head bottom and the recesses are provided on the lock plate.

By turning the lock plate about a rotational axis, the locking assembly is interchangeable between a locked and an unlocked state. As the lever is lifted upward, the drive rod which is rotatably mounted to the lid mount by a drive rod clamp rotates in the same direction as the force applied by the lever. The gear or gear-toothed surface provided on the drive rod meshes or mates with the gear or gear-toothed surface provided on the lock plate. The drive rod transfers the torque from the lever to the gear or gear-tooth surface on the lock plate. Rotation of the drive rod by the lever causes the gear or gear-toothed surface on the drive rod to drive the gear or gear-tooth surface on the lock plate.

By moving the lever in an appropriate direction, the lock plate rotates in the direction which disengages the cams from the corresponding recesses and unlocks the brew head assembly. By moving the lever in the reverse direction, the lock plate rotates in the direction which engages the cams with the corresponding recesses and locks the brew head assembly.

In another embodiment, the locking assembly further comprises a lock plate stopper 8 which prevents the lock plate from rotating when the lid mount is open. When the lid mount closes, the lock plate stopper automatically rises upward to allow the lock plate to rotate. In an embodiment, the lock plate stopper is inverse U-shaped having two prongs. In another embodiment, a spring or the like is mounted on at least one prong of the lock plate stopper. The function of the spring is to automatically push the lock plate stopper downward when the brew head assembly is open. When the brew head assembly is closed, the spring is compressed. When the brew head assembly is open, the compressed spring returns to its natural uncompressed state so that the lock plate stopper will return to the locking position.

Figure 1:
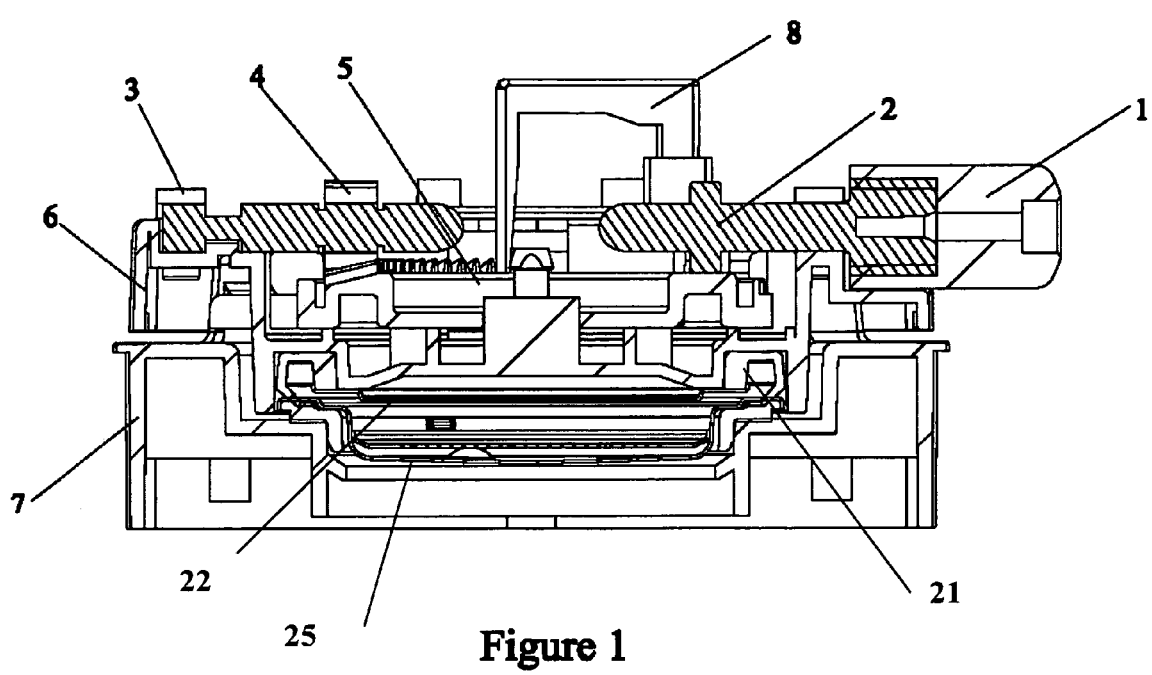
FIG. 1 is a cross-sectional view of a brew head assembly comprising a gear-driven locking assembly. The gear-driven locking assembly comprises a rotating lock plate 5.
Figure 2:
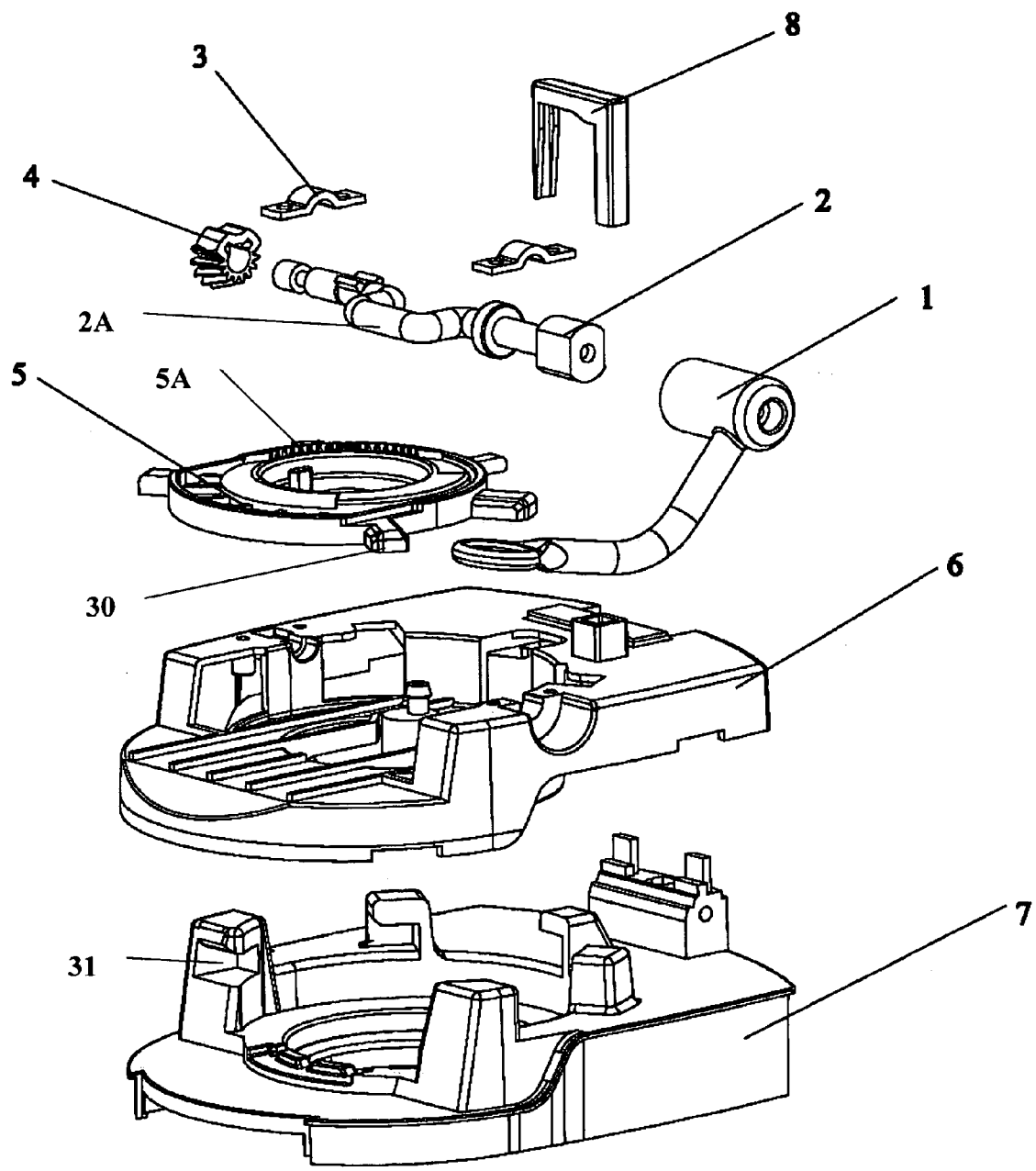
FIG. 2 is an exploded view of a brew head assembly comprising a gear-driven locking assembly. The locking assembly further comprises a rotating lock plate 5.

FIG. 2 is an exploded view of a gear-driven locking assembly of the present invention comprising a rotating lock plate. As shown in FIG. 2, the locking assembly comprises a drive rod 2 rotatably-mounted on the lid mount of the brew head assembly, a lock plate 5 rotatably-mounted on the lid mount 6 of the brew head assembly, a gear 4 or gear-toothed surface provided on the drive rod, a gear or gear-toothed surface 5A provided on the rotating lock plate 5, a lever 1 attached to the drive rod 2 for rotating the drive rod 2 and for transferring torque from the lever 1 to the gear or gear-toothed surface on the drive rod and on the rotating lock plate, wherein the rotating lock plate is provided with locking cams 30 and wherein the brew head bottom of the brew head assembly is provided with corresponding recesses 31. In an embodiment, the drive rod comprises a U-shaped member 2A.

In one embodiment, the gear 4 is attached to the drive rod by E-clip. In another embodiment, the drive rod 2 is rotatably-attached to the lid mount by two drive rod clamps 3. In a further embodiment, a lock plate stopper 8 is provided on the lid mount to prevent the lock plate from rotating as the lever is being pulled downward to close the brew head assembly.

In an embodiment, the drive rod, gear, and lock plate are made of a sturdy material, preferably aluminum die cast. The lid mount 6 is pivotally attached to the brew head bottom 7 by a hinge pin or the like, or by other conventional hinge mechanism.

FIGS. 3 and 4 show the lock plate 5 turning in the counter-clockwise direction as shown by arrow 9 to unlatch/unlock the brew head assembly and in the clockwise direction as shown by arrow 10 to latch/lock the brew head assembly, respectively.

FIG. 5 shows the lever 1 and gear 4 moving in the direction of arrow 11 to latch/lock the brew head assembly.

Gear-Driven Sliding Lock Plate Locking Assembly

The gear-driven locking assembly of the present invention is useful for locking and unlocking the brew head of a coffee maker. The gear-driven locking assembly comprises a lever, a drive rod with ribs for holding gear(s) or gear-toothed surface, a drive rod clamp, a sliding lock plate provided with a gear-toothed surface disposed on its upper surface, a gear stopper, a lid mount, and a brew head bottom, all operatively linked to form the gear-driven locking assembly.

In a preferred embodiment, two gears are attached to the drive rod. The drive rod is rotatably mounted on the lid mount and is attached to the lever. When the drive rod rotates, the gears on the drive rod also rotate in the same direction. The sliding lock plate is moveably mounted on the lid mount. The gear-toothed surface disposed on the upper surface of the lock plate is intermeshed with the gear(s) or gear-toothed surface provided on the drive rod. Rotating the drive rod will cause the sliding lock plate to move inward or outward in a linear sliding manner and will cause the cams and corresponding recesses to engage or disengage, thereby locking or unlocking the brew head, respectively. In a preferred embodiment, the sliding lock plate is provided with at least two cams.

The drive rod, gear or gear-toothed surface, and sliding lock plate are forged, molded, constructed or fabricated from any material suitable for its intended function, such as metal, plastic, synthetic polymer, heat-resistant plastic, or the like. A suitable material may be forged or injection molded into the desired form. The components of the locking assembly should be formed of a suitable material which will maintain its strength and integrity and provide sturdy support. In a preferred embodiment, the drive rod and gear or gear-toothed surface are made of metal, preferably aluminum die cast. The lever, drive rod, gears, drive rod clamp, gear stopper, and the sliding lock plate are operatively-mounted on the lid mount.

This invention provides a gear driven locking assembly comprising a lever mounted on one side of the brew head assembly which allows one hand operation to lock or unlock the brew head assembly.

The locking and unlocking of the brew head assembly is effectuated or assisted by a plurality of cams provided on a sliding lock plate and by corresponding recesses provided on the brew head assembly, preferably on the brew head bottom. In a preferred embodiment, the lock plate comprises at least three cams and the brew head bottom comprises three corresponding recesses.

By moving the sliding lock plate in a linear sliding manner, the locking assembly is interchangeable between a locked and an unlocked state. As the lever is lifted upward, the drive rod which is rotatably mounted to the lid mount by a drive rod clamp rotates in the same direction as the lever. The gear or gear-toothed surface provided on the drive rod meshes or mates with the gear-toothed surface provided on lock plate. The drive rod transfers the torque from the lever to the gear-toothed surface on the slide lock plate. The rotation of the drive rod by the lever causes the gear or gear-tooth surface on the driving rod to drive the gear teeth surface on the lock plate.

By moving the lever in an appropriate direction, the lock plate slides linearly in a direction which disengages the cams from the corresponding recesses and unlocks the brew head assembly. By moving the lever in the reverse direction, the lock plate slides linearly in a direction which engages the cams with the corresponding recesses and locks the brew head assembly.

In another embodiment, the locking assembly further comprises a gear stopper 14. In a further embodiment, the gear stopper is inverse L-shaped with a substantially vertical member and a substantially horizontal member. In a further embodiment, the horizontal member comprises a hook-like member or an appropriately-shaped protrusion which meshes with the gear or gear-tooth surface of the drive rod, and thus, prevents the lock plate from sliding when the lid mount is open. When the lid mount closes, the gear stopper automatically rises upward and un-meshes with the gear or gear-tooth surface of the drive rod to allow the gear to rotate freely and effectuate the locking of the brew head assembly.

FIG. 7 is an exploded view of a gear-driven locking assembly of the present invention comprising a sliding lock plate. As shown in FIG. 7, the locking assembly comprises a drive rod 13 rotatably-mounted on the lid mount 6 of the brew head assembly, a sliding lock plate 16 moveably-mounted on the lid mount of the brew head assembly, a gear 15 or gear-toothed surface attached to the drive rod, a gear-tooth surface 16A provided on the sliding lock plate 16, a lever attached to the drive rod 13 for rotating the drive rod 13 and for transferring torque from the handle 1 to the gear 15 or gear-tooth surface on the drive rod and on the sliding lock plate, wherein the sliding lock plate is provided with cams 30 and wherein the brew head bottom of the brew head assembly is provided with corresponding recesses 31.

In an embodiment, the gear 15 is attached to the drive rod 13 by E-clips. In a preferred embodiment, two gears are attached to the drive rod. In a further embodiment, the drive rod 13 is rotatably-attached to the lid mount by two drive rod clamps 3. In yet a further embodiment, a gear stopper 14 is provided on the lid mount to prevent the sliding lock plate from moving when the lever is being pulled downward to close the brew head assembly. In yet another embodiment, the drive rod, gear or gear-tooth surface, and lock plate are made of a sturdy material, preferably aluminum die cast. The lid mount 6 is pivotally attached to the brew head bottom 7 by the hinge pin or the like, or by other conventional hinge mechanism.

FIGS. 10 and 11 show the sliding lock plate 16 moving back and forth between the latched/locked and the un-latch/unlocked position.

FIG. 12 shows the lever 1 and gear 15 moving in the direction of arrow 20 and 19, respectively, to latch/lock the brew head assembly.

Example 3

Sealing Assembly

The sealing assembly comprises a seal ring, a water spreader, a pod ejector, a metal filter, a pod holder, and a coffee collector. The sealing assembly may further comprise a brew head bottom. In one embodiment, the shape of the seal ring is round with a flap end on the bottom side and is capable of withstanding pressures of up to four (4) bars. In another embodiment, the seal ring is constructed to maintain liquid- and/or pressure-tight sealing up to twenty (20) bars. In a particular embodiment, the seal ring is a seal, O-ring, or gasket. In another embodiment, the seal ring is made of natural rubber, silicon rubber, rubber-like polymer, or synthetic plastic or material possessing similar characteristics. The seal ring is made of a suitable material capable of preventing leaks at pressures up to twenty (20) bars. In a preferred embodiment, the seal ring is made of an elastomer material, preferably silicone rubber.

FIG. 15 shows a sealing assembly of the present invention. The sealing assembly is mounted on the under side of the lid mount 5. In FIG. 11, the water spreader 22 is adapted to support the seal ring 21. The water spreader and the seal ring are fixed to the lid mount 5 by a screw or by other suitable fastening means well-known to one of ordinary skill in the art, including, but not limiting to, a rivet, nut, or bolt. In a preferred embodiment, the seal ring 21 has a flap on its lower portion to improve sealing between the lid mount and the pod holder. The pod ejector 23 prevents the coffee pod from sticking to the water spreader 22. In one embodiment, the pod ejector is attached to the water spreader.

The filter is configured for holding the coffee pod or coffee grounds.

A filter 24, preferably made of metal, is fixed on the pod holder 25 to prevent the coffee pod or coffee grounds from blocking the outlet holes 25A provided in the pod holder. The upper rim of the pod holder is designed to improve sealing between the pod holder and the lid mount. The coffee collector 26 holds the brewed coffee temporarily before it flows into a cup or container through a spout located on the bottom of the coffee collector.

As previously noted, the brew head assembly of the present invention may be adapted to brew tea, hot chocolate, herbal drinks, and similar beverages or extracts and the like. Additional advantages and modifications will be readily apparent to one of ordinary skill when following the teachings of the present invention.

EQUIVALENTS

Those skilled in the art will recognize, or be able to ascertain using no more than routine experimentation, many equivalents to the specific embodiments of the invention described herein. Such equivalents are intended to be encompassed by the following claims.

What is claimed is:

1. A gear-driven locking assembly for a brew head assembly that includes a brew head bottom unit for attachment to a beverage brewing device and a lid mount unit pivotally connected to the brew head bottom unit to move between an open position and a closed position, the locking assembly comprising:
   A) a drive rod rotatably mounted on the lid mount unit;
   B) a lever attached to the drive rod;
   C) a rotating lock plate rotatably mounted on the lid mount unit having at least one cam provided on the periphery of the lock plate to interact with means for forming a like number of corresponding recesses on the brew head bottom unit;
   D) first gear means on the drive rod;
   E) second gear means provided on the lock plate wherein the first and second gear means intermesh with one another for rotating the lock plate between a locked and an unlocked position; and
   F) a lock plate stopper means for blocking the movement of the lock plate when the lid mount is being closed.

2. The locking assembly of claim 1 further comprising a sealing assembly in the brew head bottom unit whereby the locking assembly and sealing assembly provide a liquid- and pressure-tight seal when the lid mount unit and lock plate are in their closed and locked positions, respectively.

3. The locking assembly of claim 2 wherein the sealing assembly and the locking assembly provide a liquid- and pressure-tight seal up to twenty (20) bars.

4. The locking assembly of claim 1 wherein the first gear means is a bevel gear.

5. The locking assembly of claim 1 wherein the drive rod comprises a U-shaped member.

6. The locking assembly of claim 2 wherein components of the locking and sealing assembly are molded or forged from plastic, metal or a suitable material having a sufficient combination of strength and rigidity to maintain their structural integrity.

7. The locking assembly of claim 1 wherein a locking cam has a wedge shape.

8. The locking assembly of claim 1 wherein the lock plate stopper means includes a U-shaped stopper and means for biasing the stopper to its blocking position.

9. A brew head assembly, comprising:
a) the locking assembly of claim 1; and
b) a sealing assembly operatively connected to the locking assembly to provide a liquid- and pressure-tight seal of up to twenty (20) bars when the brew head assembly is in a closed position, wherein the sealing assembly comprises a seal ring, water spreader, pod ejector, metal filter, pod holder, and coffee collector which are operatively linked to form the sealing assembly.

10. The brew head assembly of claim 9 wherein the seal ring is round with a flap on its bottom portion for improved sealing.

11. A gear-driven locking assembly for a brew head assembly that includes a brew head bottom unit for attachment to a beverage brewing device and a lid mount unit pivotally connected to the brew head bottom unit to move between an open position and a closed position, the locking assembly comprising:
A) a drive rod rotatably mounted on the lid mount unit;
B) a lever attached to the drive rod;
C) a sliding lock plate moveably mounted for linear motion on the lid mount unit having at least one cam provided on the periphery of the lock plate to interact with means for forming a like plurality of corresponding recesses the brew head bottom unit;
D) first gear means on the drive rod; and
E) second gear means provided on the lock plate wherein the first and second gear means intermesh with one another for moving the lock plate between a locked and an unlocked position along a linear path.

12. The locking assembly of claim 11 further comprising a sealing assembly in the brew head bottom unit whereby the locking assembly and sealing assembly provide a liquid- and pressure-tight seal when the lid mount unit and lock plate are in their closed and locked positions, respectively.

13. The locking assembly of claim 12 wherein the sealing assembly and the locking assembly provide a liquid-tight and a pressure-tight seal up to twenty (20) bars.

14. The locking assembly of claim 11 wherein the second gear means on the lock plate has a linear arrangement.

15. The locking assembly of claim 11 wherein a locking cam has a wedge shape.

16. The locking assembly of claim 12 wherein components of the locking and sealing assembly are molded or forged from plastic, metal or a suitable material having a sufficient combination of strength and rigidity to maintain their structural integrity.

17. The locking assembly of claim 11 further comprising lock plate stopper means for blocking the movement of the lock plate when the lid mount unit is being closed.

18. The locking assembly of claim 17 wherein the lock plate stopper means has an L-shaped stopper and means for biasing the stopper to its blocking position.

19. A brew head assembly, comprising:
a) the locking assembly of claim 17; and
b) a sealing assembly operatively connected to the locking assembly to provide a liquid- and pressure-tight seal of up to twenty (20) bars when the brew head assembly is in a closed position, wherein the sealing assembly comprises a seal ring, water spreader, pod ejector, metal filter, pod holder, and coffee collector which are operatively linked to form the sealing assembly.

20. A brew head assembly for a beverage brewing device including a brew head bottom unit for attachment to the beverage brewing device and a lid mount unit pivotally connected to the brew head bottom unit for rotation between unlocked and locked positions, the improvement of first and second complementary locking means attached to the lid mount unit and the brew head bottom unit, respectively wherein the first locking means comprises:
A) a displaceable locking plate on the lid mount unit that moves between first and second positions,
B) a lever pivotally mounted on the lid mount unit that moves between locked and unlocked positions through an intermediate position,
C) means on the lid mount unit for responding to movement of the lever between the unlocked and intermediate positions by pivoting the lid mount unit and responding to the movement of the lever between the intermediate and locked positions by moving the locking plate to its second position thereby to engage the second complementary locking mean, and
D) means for blocking the displacement of the locking plate while the lever travels between the first and intermediate positions.

21. A brew head assembly as recited in claim 20 wherein the first and second complementary locking means include, respectively, a cam on one of the lid mount unit and brew head bottom unit and means for forming a recess that receives the cam on the other of the lid mount unit and brew head bottom unit when the locking plate is in the second position.

22. A brew head assembly as recited in claim 21 wherein said lever movement responsive means includes a drive gear mounted to the lever and a driven gear means on a surface of the locking plate.

23. A brew head assembly as recited in claim 22 wherein the locking plate mounts to the lid mount unit for rotational movement and wherein the drive gear is a bevel gear and the driven gear lies on an arcuate path.

24. A brew head assembly as recited in claim 23 wherein the cam is on the lid mount unit and engages and disengages the recess means along an arcuate path.

25. A brew head assembly as recited in claim 22 wherein the locking plate mounts to the lid mount unit for linear movement and wherein the drive gear is a bevel gear and the driven gear lies on a linear path.

26. A brew head assembly as recited in claim 23 wherein the cam is on the lid mount unit and engages and disengages the recess means along a linear path.

27. A brew head assembly as recited in claim 26 wherein the first and second complementary locking means include, respectively, a plurality of spaced cams on one of the lid mount unit and brew head bottom unit and means for forming a corresponding plurality of recesses that receive the cams on the other of the lid mount unit and brew head bottom unit when the locking plate is in the second position.

28. A brew head assembly as recited in claim 27 wherein said lever movement responsive means includes a drive gear mounted to the lever and a driven gear means on a surface of the locking plate.

29. A brew head assembly as recited in claim 28 wherein the locking plate mounts to the lid mount unit for rotational movement and wherein the drive gear is a bevel gear and the driven gear lies on an arcuate path.

30. A brew head assembly as recited in claim 29 wherein the cam is on the lid mount unit and engages and disengages the recess means along an arcuate path.

31. A brew head assembly as recited in claim 29 wherein said blocking means includes a U-shaped stopper mounted on the lid mount unit for being moved into a position that blocks movement of the lever, the stopper being displaced into a position that enables motion of the lever when the lid mount unit rotates into its locked position and the brew head bottom unit engages and displaces the stopper whereby further movement of the lever produces the rotation of the locking plate.

32. A brew head assembly as recited in claim 31 wherein the blocking means includes a spring mounted between the stopper and the lid mount unit to bias the stopper to its blocking position.

33. A brew head assembly as recited in claim 28 wherein the locking plate mounts to the lid mount unit for linear movement and wherein the drive gear is a bevel gear and the driven gear lies on a linear path.

34. A brew head assembly as recited in claim 33 wherein the cam is on the lid mount unit and engages and disengages the recess means along a linear path.

35. A brew head assembly as recited in claim 33 wherein said blocking means includes an L-shaped stopper mounted on the lid mount unit for being moved into a position that blocks movement of the lever, the stopper being displaced into a position that enables motion of the lever when the lid mount unit rotates into its locked position and the brew head bottom unit engages and displaces the stopper whereby further movement of the lever produces the rotation of the locking plate.

36. A brew head assembly as recited in claim 35 wherein the blocking means includes a spring mounted between the stopper and the lid mount unit to bias the stopper to its blocking position.

* * * * *